United States Patent
Chu et al.

(10) Patent No.: US 12,213,076 B2
(45) Date of Patent: Jan. 28, 2025

(54) DEVICE, SYSTEM, AND METHOD FOR TRANSMISSIONS DURING A RESTRICTED TARGET WAKE TIME (RTWT) SERVICE PERIOD (SP)

(71) Applicant: NXP USA, Inc., Austin, TX (US)

(72) Inventors: Liwen Chu, San Ramon, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 365 days.

(21) Appl. No.: 17/869,643

(22) Filed: Jul. 20, 2022

(65) Prior Publication Data

US 2023/0026249 A1     Jan. 26, 2023

Related U.S. Application Data

(60) Provisional application No. 63/364,068, filed on May 3, 2022, provisional application No. 63/268,309, filed on Feb. 21, 2022, provisional application No. 63/262,951, filed on Oct. 22, 2021, provisional application No. 63/223,570, filed on Jul. 20, 2021.

(51) Int. Cl.
    *H04W 52/02*     (2009.01)
    *H04W 28/02*     (2009.01)

(52) U.S. Cl.
    CPC ... *H04W 52/0248* (2013.01); *H04W 28/0268* (2013.01)

(58) Field of Classification Search
    CPC ................. H04W 52/0248; H04W 28/0268
    See application file for complete search history.

(56) References Cited

U.S. PATENT DOCUMENTS

| | | | |
|---|---|---|---|
| 2024/0179744 A1* | 5/2024 | Baek | H04W 74/0808 |
| 2024/0251443 A1* | 7/2024 | Lu | H04W 74/006 |

OTHER PUBLICATIONS

IEEE, "IEEE Standard 802.11be D1.0; Part 11: Wireless LAN Medium Access Control (MAC) and Physical Layer (PHY) Specifications; Amendment 8: Enhancements for extremely high throughput (EHT)", section 35.6.4, 2021, 36 pgs.

* cited by examiner

*Primary Examiner* — Wayne H Cai

(57) ABSTRACT

A device, a system, and a method for transmissions during a restricted Target Wake Time (rTWT) Service Period (SP) are disclosed. In an embodiment, the device includes a wireless network interface device implemented on one or more integrated circuits (ICs), where the wireless network interface device is configured to transmit a beacon on a first link that indicates an rTWT SP for the first link, transmit a frame prior to a wake period of the rTWT SP, where the frame is transmitted during a first Transmission Opportunity (TXOP) that overlaps with the wake period, and transmit low latency traffic on the first link during the wake period, where the first TXOP that overlaps with the wake period is at least one of ended and continued.

20 Claims, 10 Drawing Sheets

DEVICE, SYSTEM, AND METHOD FOR TRANSMISSIONS DURING A RESTRICTED TARGET WAKE TIME (RTWT) SERVICE PERIOD (SP)

CROSS-REFERENCE TO RELATED APPLICATIONS

This application is entitled to the benefit of U.S. Provisional Patent Application Ser. No. 63/223,570, filed on Jul. 20, 2021, U.S. Provisional Patent Application Ser. No. 63/252,951, filed on Oct. 22, 2021, U.S. Provisional Patent Application Ser. No. 63/268,309, filed on Feb. 21, 2022, and U.S. Provisional Patent Application Ser. No. 63/364,068, filed on May 3, 2022, each of which is incorporated by reference herein.

BACKGROUND

In wireless communications, wireless devices, e.g., multi-link devices (MLDs), can execute various multi-link operations, such as transmission and reception of frames via one or more communication links. As an example, wireless devices may transmit and receive frames on one or more links to exchange information and data. When a frame is transmitted during a restricted Target Wake Time (rTWT) Service Period (SP), there may be certain restrictions that are not supported by one or more wireless devices involved in the transmission. Consequently, transmissions during the rTWT SP may be complicated and/or inefficient, which may cause the wireless device(s) involved in such transmissions to experience restricted performance.

SUMMARY

A device, a system, and a method for transmissions during a restricted Target Wake Time (rTWT) Service Period (SP) are disclosed. In an embodiment, the device includes a wireless network interface device implemented on one or more integrated circuits (ICs), where the wireless network interface device is configured to transmit a beacon on a first link that indicates an rTWT SP for the first link, transmit a frame prior to a wake period of the rTWT SP, where the frame is transmitted during a first Transmission Opportunity (TXOP) that overlaps with the wake period, and transmit a low latency traffic on the first link during the wake period, where the first TXOP that overlaps with the wake period is at least one of ended and continued.

In an embodiment, when the first TXOP is ended, the low latency traffic is transmitted during a second TXOP that starts at a beginning of the wake period.

In an embodiment, when the first TXOP is continued the frame is ended at a beginning of the wake period, and the low latency traffic is transmitted during the first TXOP that continues through the beginning of the wake period.

In an embodiment, the first TXOP is ended by a non-access point (non-AP) station (STA) of a non-AP Multi-Link Device (MLD) associated with the device at a beginning of the wake period if at least one of the non-AP STA is a first non-AP STA associated with the device on the first link and is a member of the rTWT SP for the first link, the non-AP STA is a second non-AP STA associated with the device on a second link and has an on-going TXOP on the second link, where the second non-AP STA is a TXOP holder, and the non-AP MLD has Traffic Identifier (TID) to link mapping, where the low latency traffic is not mapped to the second link.

In an embodiment, a frame exchange on a second link is ended by an access point (AP) that is associated with a non-AP STA of a non-AP MLD at a beginning of the wake period if at least one of the non-AP STA is a first non-AP STA associated with the device on the first link and is a member of the rTWT SP for the first link, the non-AP STA is a second non-AP STA associated with the device on the second link and has an on-going TXOP on the second link, where the second non-AP STA is a TXOP responder, and the non-AP MLD has TID to link mapping, where the low latency traffic is not mapped to the second link.

In an embodiment, the first TXOP is continued by a non-AP STA of a non-AP MLD associated with the device at a beginning of the wake period if at least one of the non-AP STA is a first non-AP STA associated with the device on the first link and is a member of the rTWT SP for the first link, the non-AP STA is a second non-AP STA associated with the device on a second link and has an on-going TXOP on the second link, where the second non-AP STA is a TXOP holder, and the non-AP MLD has TID to link mapping, where the low latency traffic is mapped to the first link and the second link.

In an embodiment, a frame exchange on a second link is continued by an AP that is associated with a non-AP STA of a non-AP MLD at a beginning of the wake period if at least one of the non-AP STA is a first non-AP STA associated with the device on the first link and is a member of the rTWT SP for the first link, the non-AP STA is a second non-AP STA associated with the device on the second link and has an on-going TXOP on the second link, where the second non-AP STA is a TXOP responder, and the non-AP MLD has TID to link mapping, where the low latency traffic is mapped to the first link and the second link.

In an embodiment, the first TXOP is for low priority traffic, and when the first TXOP is continued, the low latency traffic is transmitted during a remaining duration of the first TXOP.

In an embodiment, the first TXOP is at least one of ended and continued when a backoff counter for an Access Category (AC) becomes zero within the rTWT SP.

In an embodiment, when the first TXOP is continued, the low latency traffic is transmitted during a remaining duration of the first TXOP, where a Contention Window (CW) and a Quality of Service (QoS) Short Retry Counter (QSRC) of an AC are unchanged during the remaining duration of the first TXOP.

In an embodiment, when the first TXOP is ended, the low latency traffic is transmitted during a second TXOP, where a CW and a QSRC of the AC are unchanged.

In an embodiment, when a Target Beacon Transmission Time (TBTT) is within the rTWT SP, the device schedules another beacon transmission regardless of whether the low latency traffic has finished being transmitted.

In an embodiment, when a Delivery TBTT (DTBTT) is within the rTWT SP, the device schedules a Delivery Traffic Indication Map (DTIM) beacon regardless of whether the low latency traffic has finished being transmitted.

In an embodiment, the rTWT SP is at least one of a trigger enabled rTWT SP and a non-trigger enabled rTWT SP, and where a backoff counter of a TID becomes zero before the device transmits the low latency traffic.

In an embodiment, when the backoff counter of the TID becomes zero and an STA still has the low latency traffic to transmit, the STA uses a current CW to start another backoff procedure for non-low latency traffic.

In an embodiment, when the backoff counter of the TID becomes zero and an STA still has the low latency traffic to transmit, the STA suspends a backoff procedure for non-low latency traffic.

In an embodiment, the STA resumes the suspended backoff procedure when the STA finishes transmitting the low latency traffic.

In an embodiment, the beacon includes rTWT SP schedules of other APs that are at least one of in a same multiple Basic Service Set (BSS) Identifier (BSSID), co-hosted APs, and neighbor APs.

A system for transmissions during an rTWT SP is also disclosed. In an embodiment, the system includes a first wireless device, where the first wireless device includes a wireless network interface device implemented on one or more ICs, where the wireless network interface device is configured to transmit a beacon on a first link that indicates an rTWT SP for the first link, transmit a frame prior to a wake period of the rTWT SP, where the frame is transmitted during a first TXOP that overlaps with the wake period, transmit low latency traffic on the first link during the wake period, where the first TXOP that overlaps with the wake period is at least one of ended and continued, and a second wireless device, where the second wireless device includes another wireless network interface device implemented on one or more other ICs, and where the other wireless network interface device is configured to receive the beacon, the frame, and the low latency traffic on the first link.

A method for transmissions during an rTWT SP is also disclosed. In an embodiment, the method for transmissions during an rTWT SP includes transmitting a beacon on a first link that indicates an rTWT SP for the first link, transmitting a frame prior to a wake period of the rTWT SP, where the frame is transmitted during a first TXOP that overlaps with the wake period, and transmitting low latency traffic on the first link during the wake period, where the first TXOP that overlaps with the wake period is at least one of ended and continued.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
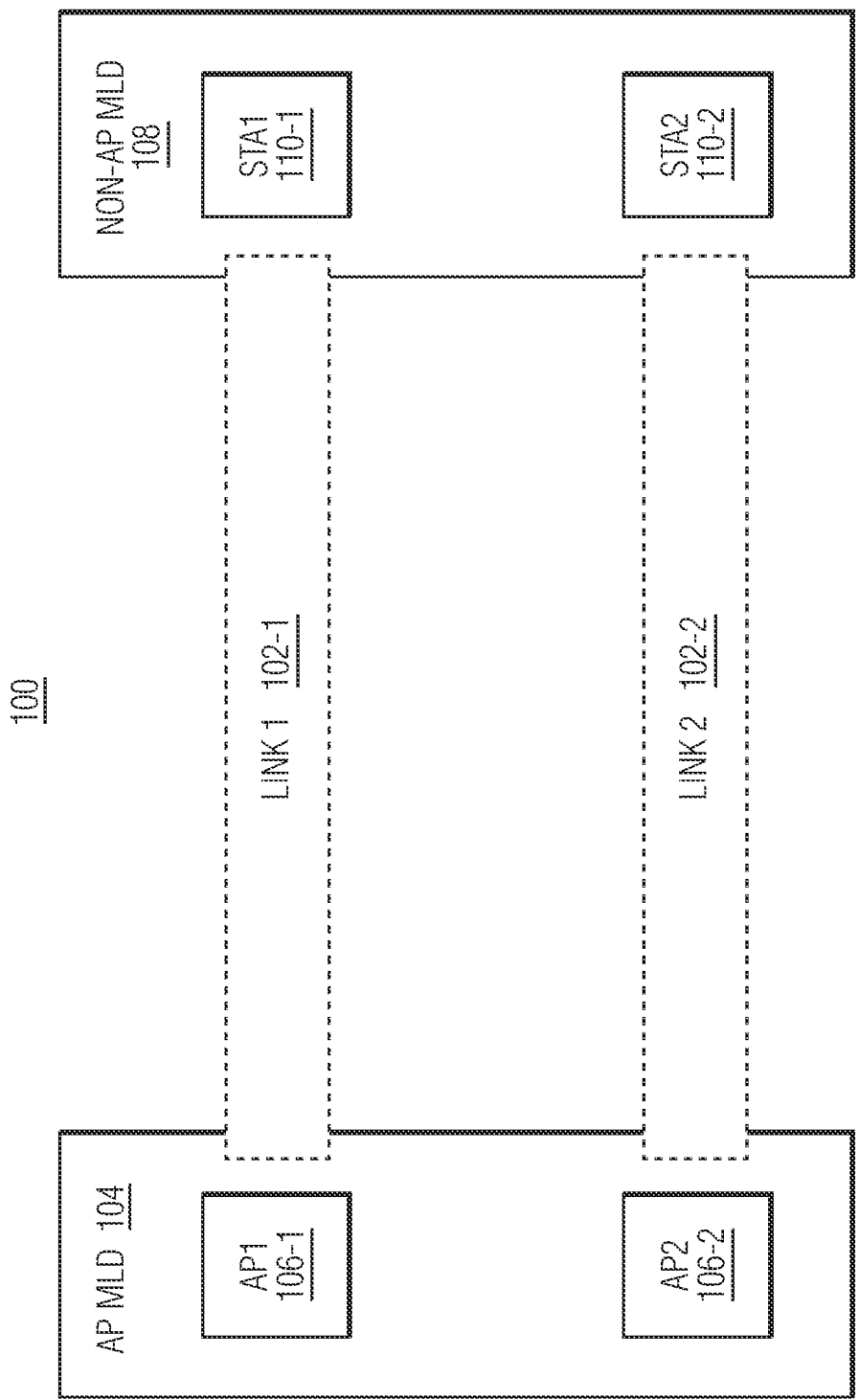
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-access point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first wireless device, and the non-AP MLD 108 may be a second wireless device. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol.

Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., Beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device, such that the APs include a wireless network interface implemented on one more ICs. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two STAs (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device, such that the STAs include a wireless network interface device implemented on one or more ICs. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., Link1 102-1 and Link2 102-2. For example, each of the STAs 110-1 or 110-2 communicates with AP1 106-1 or AP2 106-2 via corresponding communication links 102-1 or 102-2. In an embodiment, a communication link (e.g., Link1 102-1 or Link2 102-2) may include a BSS operating channel established by an AP (e.g., AP1 106-1 or AP2 106-2) that features multiple 20 MHz channels used to transmit frames in Physical Layer Convergence Procedure (PLCP) Protocol Data Units (PPDUs) (e.g., Date frames, Control frames, Management frames, Beacon frames, Action frames, etc.) between an AP MLD and a non-AP MLD. The PPDUs may be transmitted at signal bandwidths of, for example, 80 MHz, 160 MHz, or 320 MHz, and may include 20 MHz channels (sometimes referred to as "units"). In some embodiments, a 20 MHz channel may be a punctured 20 MHz channel (sometimes referred to as a "punctured channel" or a "punctured unit") or an unpunctured 20 MHz channel (sometimes referred to as an "unpunctured channel" or an "unpunctured unit"). Similar channels or units of a PPDU may be aggregated to form larger units (sometimes referred to as "segments"). For example, two unpunctured channels may be aggregated to form one unpunctured segment with a bandwidth of 40 MHz. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via links 102-1 and 102-2, in other embodiments, the AP MLD 104 may communicate (e.g., wirelessly communicate) with the non-AP MLD 108 via more than two communication links or less than two communication links.

In some embodiments, an AP (e.g., AP1 106-1) or an AP MLD (e.g., AP MLD 104) transmits a beacon that indicates a restricted Target Wake Time (rTWT) Service Period (SP) for a corresponding link (e.g., Link1 102-1). As described herein, an "rTWT SP" may define a Target Wake Time (TWT) Start Time, a TWT Wake Duration (sometimes referred to herein as a "wake period"), and a TWT Interval for when an AP and/or an STA may exchange (e.g., transmit and/or receive) low latency traffic. As an example, a "TWT Start Time" refers to a beginning of a TWT Wake Duration, such that the beginning of a first TWT Wake Duration is a point at which an rTWT SP starts, a "TWT Wake Duration" refers to a period or a duration of time (e.g., at least 1 millisecond (ms)) for exchanging low latency traffic, and a "TWT Interval" refers to a duration of time (e.g., at least 2 ms) from a beginning of a first TWT Wake Duration to a beginning of another TWT Wake Duration during the rTWT SP.

As described herein, "low latency traffic" may refer to traffic (e.g., data, frames, PPDUs, packets, etc.) that is time-sensitive, where a minimal delay can degrade the quality of a higher level application. Examples of low latency traffic may include real-time voice traffic or video traffic for applications such as live voice conversations, live video conversations, online gaming, etc. In contrast, traffic that is not low latency (non-low latency traffic) may include, for example, traffic that is not time-sensitive in that quality of the higher level application is not degraded with minimal delay. Examples of non-low latency traffic may include emails, file transfers (e.g., uploads and/or downloads), file transfer protocol (FTP), etc.

According to conventional wireless communications, a non-AP STA operating in accordance with an EHT communication protocol (e.g., an EHT non-AP STA) may need to stop its transmission at the beginning of a wake period of an rTWT SP so that an AP that is associated with the non-AP STA can exchange low latency traffic during the rTWT SP. However, the EHT non-AP STA may be part of an MLD that is not a simultaneous transmit and receive (STR) MLD (e.g., a non-simultaneous transmit and receive (NSTR) non-AP MLD), and therefore may not have STR capabilities. Consequently, conventional transmissions during an rTWT SP may be complicated and/or inefficient. As such, wireless devices using the conventional wireless communication techniques may experience restricted performance.

In accordance with an embodiment of the invention, a technique for transmissions during an rTWT SP involves transmitting a beacon on a first link that indicates an rTWT SP for the first link, transmitting a frame prior to a wake period of the rTWT SP, wherein the frame is transmitted during a first Transmission Opportunity (TXOP) that overlaps with the wake period, and transmitting low latency traffic on the first link during the wake period, wherein the first TXOP that overlaps with the wake period is at least one of ended and continued. In some embodiments, the device is an AP of an AP MLD, an AP MLD, a non-AP STA of a non-AP MLD, or a non-AP MLD. By continuing or ending the first TXOP that overlaps with the wake period, transmissions before and/or during the wake period of the rTWT SP are supported by the transmitting device and the receiving device. As such, transmissions during an rTWT SP may be performed more efficiently, and wireless devices may experience an improvement of performance.

Examples of transmissions during an rTWT SP are described in further detail with reference to FIGS. 2-7.

Figure 2:
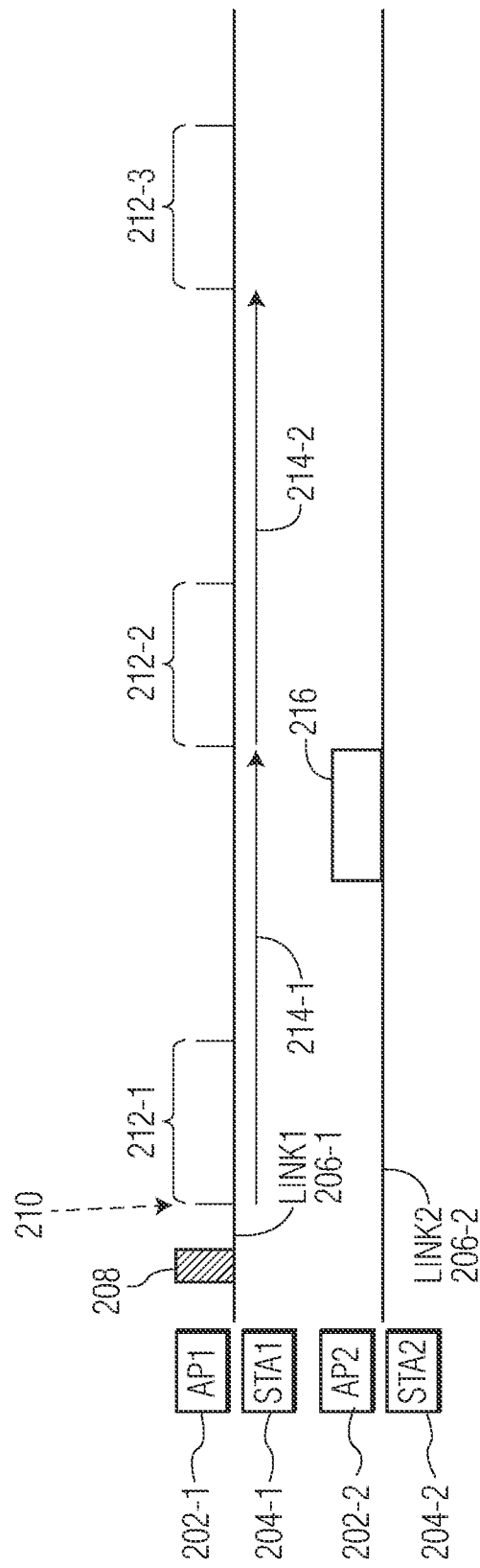
FIG. 2 illustrates an example of transmissions during a restricted Target Wake Time (rTWT) Service Period (SP).

FIG. 2 illustrates an example of transmissions during an rTWT SP. In an embodiment, an AP MLD (not shown) with two affiliated APs, AP1 202-1 and AP2 202-2, operate on Link1 206-1 and Link2 206-2, respectively. In addition, a non-AP MLD (not shown) with two affiliated non-AP STAs, STA1 204-1 and STA2 204-2, associates with AP1 202-1 and AP2 202-2 on Link1 206-1 and Link2 206-2, respectively. In some embodiments, the non-AP MLD may be an NSTR non-AP MLD, an enhanced multi-link single-radio (eMLSR) non-AP MLD, or an enhanced multi-link multi-radio (eMLMR) non-AP MLD. In an embodiment, the APs 202-1 and 202-2 and the STAs 204-1 and 204-2 are configured to wirelessly communicate, for example, via radios associated with the AP MLD and the non-AP MLD.

In an embodiment, AP1 202-1 transmits a beacon 208 on Link1 206-1 that indicates an rTWT SP for Link1. The rTWT SP indicated by the beacon 208 starts at a TWT Start Time (shown by dashed arrow 210), has three TWT Wake Durations, implemented as a first TWT Wake Duration 212-1, a second TWT Wake Duration 212-2, and a third TWT Wake Duration 212-3, and has two TWT Wake Intervals, implemented as a first TWT Wake Interval 214-1 and a second TWT Wake Interval 214-2. In an embodiment, the first TWT Wake Duration 212-1 and the first TWT Wake Interval 214-1 start at the TWT Start Time, the second TWT Wake Duration 212-2 and the second TWT Wake Interval 214-2 start after the first TWT Wake Interval 214-1, and the third TWT Wake Duration 212-3 starts after the second TWT Wake Interval 214-2. Although the rTWT SP is shown as including three TWT Wake Durations and two TWT Wake Intervals, the rTWT SP may also include less or more than the three TWT Wake Durations and the two TWT Wake Intervals.

In an embodiment, there is a first TXOP 216 on Link2 206-2 that is an on-going TXOP that may overlap with the second TWT Wake Duration 212-2. However, the first TXOP 216 ends at a beginning of the second TWT Wake Duration 212-2. In one embodiment, STA2 204-2 is a TXOP holder and AP2 202-2 is a TXOP responder. In another embodiment, AP2 202-2 is the TXOP holder and STA2 204-2 is the TXOP responder. As an example, a "TXOP holder" controls the TXOP.

In some embodiments, STA1 204-1 and STA2 204-2 are associated with an NSTR non-AP MLD. In such an embodiment, if STA1 is a member of the rTWT SP on Link1 206-1 and STA2 has an on-going TXOP (e.g., first TXOP 216) as a TXOP holder on Link2 206-2, then STA2 stops its TXOP at the beginning of the second TWT Wake Duration 212-2. Alternatively, in such embodiment, if STA1 is a member of the rTWT SP on Link1 and AP2 202-2 has an on-going TXOP (e.g., first TXOP 216) on Link2 where STA2 is a TXOP responder, then the AP MLD stops its frame exchange with STA2 at the beginning of the second TWT Wake Duration 212-2.

In some embodiments, STA1 204-1 and STA2 204-2 are associated with an eMLSR non-AP MLD or an eMLMR non-AP MLD (eMLSR/eMLMR non-AP MLD) that may need to switch to multiple link monitoring from a TXOP (e.g., first TXOP 216) in one link with a radio switch time of RadioSwitchTime. In such an embodiment, if STA1 is a member of the rTWT SP on Link1 206-1 and STA2 has an on-going TXOP (e.g., first TXOP 216) as a TXOP holder on Link2 206-2, then STA2 stops its TXOP RadioSwitchTime before the beginning of the second TWT Wake Duration 212-2. Alternatively, in such an embodiment, if STA1 is a member of the rTWT SP on Link1 and AP2 202-2 has an on-going TXOP (e.g., first TXOP 216) on Link2 206-2 where STA2 is a TXOP responder, then the AP MLD stops its frame exchange with STA2 RadioSwitchTime before the beginning of the second TWT Wake Duration 212-2.

In some embodiments, a first TXOP (e.g., first TXOP 216) is ended by a non-AP STA of a non-AP MLD (e.g., NSTR non-AP MLD) associated with a device (e.g., AP) at a beginning of a wake period (e.g., second TWT Wake Duration 212-2) if the non-AP STA is a first non-AP STA (STA1 204-1) associated with the device on a first link (e.g., Link1 206-1) and is a member of the rTWT SP for the first link, the non-AP STA is a second non-AP STA (STA2 204-2) associated with the device on a second link (e.g., Link2 206-2) and has an on-going TXOP on the second link (e.g., first TXOP 216), where the second non-AP STA is a TXOP holder, or the non-AP MLD has Traffic Identifier (TID) to link mapping, where the low latency traffic is not mapped to the second link.

In some embodiments, a frame exchange on a second link (e.g., Link2 206-2) is ended by an AP that is associated with a non-AP STA of a non-AP MLD (e.g., NSTR non-AP MLD) at a beginning of a wake period (e.g., second TWT Wake Duration 212-2) if the non-AP STA is a first non-AP STA (e.g., STA1 204-1) associated with the device on a first link (e.g., Link1 206-1) and is a member of the rTWT SP for the first link, the non-AP STA is a second non-AP STA (STA2 204-2) associated with the device on the second link and has an on-going TXOP on the second link (e.g., first TXOP 216), where the second non-AP STA is a TXOP responder, or the non-AP MLD has TID to link mapping, where the low latency traffic is not mapped to the second link.

Figure 3:
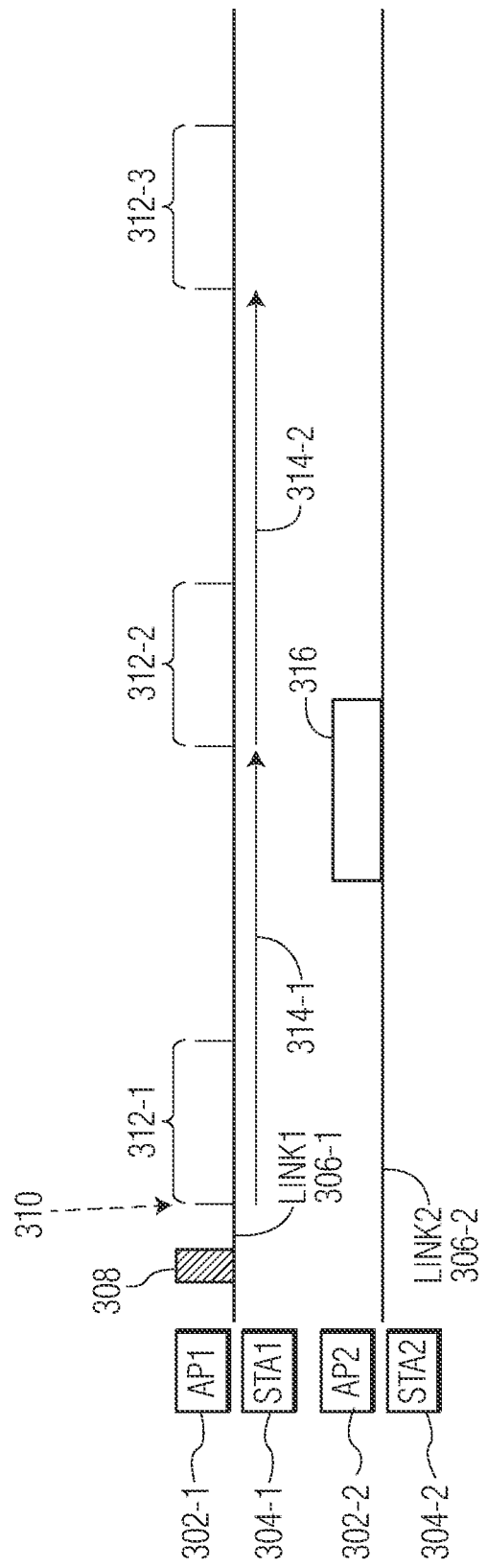
FIG. 3 illustrates another example of transmissions during an rTWT SP.

FIG. 3 illustrates another example of transmissions during an rTWT SP. In an embodiment, FIG. 3 includes the AP MLD (not shown) with AP1 302-1 and AP2 302-2, the non-AP MLD (not shown) with STA1 304-1 and STA2 304-2, Link1 306-1, Link2 306-2, transmission of the beacon 308, the rTWT SP that includes the TWT Start Time (shown by dashed arrow 310), the first TWT Wake Duration 312-1, the second TWT Wake Duration 312-2, the third TWT Wake Duration 312-3, the first TWT Wake Interval 314-1, the second TWT Wake Interval 314-2, and a first TXOP 316 as previously described with reference to FIG. 2.

In contrast to FIG. 2, the first TXOP 316 shown in FIG. 3 continues through the beginning of the second TWT Wake Duration 312-2.

In some embodiments, a first TXOP (e.g., first TXOP 316) is continued by a non-AP STA of a non-AP MLD (e.g., NSTR non-AP MLD) associated with a device (e.g., AP) at a beginning of a wake period (e.g., second TWT Wake Duration 312-2) if the non-AP STA is a first non-AP STA (e.g., STA1 304-1) associated with the device on a first link (e.g., Link1 306-1) and is a member of the rTWT SP for the first link, the non-AP STA is a second non-AP STA (e.g., STA2 304-2) associated with the device on a second link (e.g., Link2 306-2) and has an on-going TXOP on the second link (e.g., first TXOP 316), where the second non-AP STA is a TXOP holder, or the non-AP MLD has TID to link mapping, where the low latency traffic is mapped to the first link and the second link.

In some embodiments, a frame exchange on a second link (e.g., Link2 306-2) is continued by an AP that is associated with a non-AP STA of a non-AP MLD (e.g., NSTR non-AP MLD) at a beginning of a wake period (e.g., second TWT Wake Duration 312-2) if the non-AP STA is a first non-AP STA (e.g., STA1 304-1) associated with the device (e.g., the AP) on a first link (e.g., Link1 306-1) and is a member of the rTWT SP for the first link, the non-AP STA is a second non-AP STA (e.g., STA2 304-2) associated with the device on the second link and has an on-going TXOP on the second link (e.g., first TXOP 316), where the second non-AP STA is a TXOP responder, or the non-AP MLD has TID to link mapping, where the low latency traffic is mapped to the first link and the second link.

In some embodiments, a first TXOP is ended by a non-AP STA of an eMLSR/eMLMR non-AP MLD associated with a device (e.g., AP) RadioSwitchTime before a beginning of a wake period (e.g., TWT Wake Duration) if the non-AP STA is a first non-AP STA associated with the device on a first link and is a member of an rTWT SP for the first link, the non-AP STA is a second non-AP STA associated with the device on a second link and has an on-going TXOP on the second link, where the second non-AP STA is a TXOP holder, or the eMLSR/eMLMR non-AP MLD has TID to link mapping, where the low latency traffic is not mapped to the second link.

In some embodiments, a frame exchange on a second link is ended by an AP that is associated with a non-AP STA of an eMLSR/eMLMR non-AP MLD RadioSwitchTime before a beginning of a wake period (e.g., TWT Wake Duration) if the non-AP STA is a first non-AP STA associated with a device (e.g., AP) on a first link and is a member of an rTWT SP for the first link, the non-AP STA is a second non-AP STA associated with the device on the second link and has an on-going TXOP on the second link, where the second non-AP STA is a TXOP responder, or the eMLSR/eMLMR non-AP MLD has TID to link mapping, where the low latency traffic is not mapped to the second link.

In some embodiments, low latency traffic is transmitted and a first TXOP is continued by a non-AP STA of an eMLSR/eMLMR non-AP MLD associated with a device (e.g., AP) at a beginning of a wake period (e.g., TWT Wake Duration) if the non-AP STA is a first non-AP STA associated with the device on the first link and is a member of the rTWT SP for the first link, the non-AP STA is a second non-AP STA associated with the device on the second link and has an on-going TXOP on the second link, where the second non-AP STA is a TXOP holder, or the non-AP MLD has TID to link mapping, where the low latency traffic is mapped to the first link and the second link.

In some embodiments, low latency traffic is transmitted and a frame exchange on a second link is continued by an AP that is associated with a non-AP STA of an eMLSR/eMLMR non-AP MLD at a beginning of a wake period (e.g., TWT Wake Duration) if the non-AP STA is a first non-AP STA associated with the device on the first link and is a member of the rTWT SP for the first link, the non-AP STA is a second non-AP STA associated with the device on the second link and has an on-going TXOP on the second link, where the second non-AP STA is a TXOP responder, or the non-AP MLD has TID to link mapping, where the low latency traffic is mapped to the first link and the second link.

In some embodiments, an EHT STA that supports low latency traffic may stop its TXOP before a wake period of an rTWT SP. Additionally, a quiet element may define a quiet interval with one time unit (TU) and may start at the same time as the wake period(s) of the rTWT SP so that legacy STAs will not access a medium during the wake period(s). As an example, a non-HE STA transmits frames from a primary Access Category (AC) first; if there is still remaining TXOP time (e.g., a remaining duration of a TXOP) after serving the primary AC, then frames from a higher priority AC can be transmitted. The AC may be AC Voice (AC_VO), AC Video (AC_VI), AC Best Effort (AC_BE), or AC Background (AC_BK). As another example, an HE AP can transmit frames from an AC in an HE MU PPDU that carries frames for multiple STAs) if such transmission does not make a TXOP longer when compared with frames from a primary AC. As yet another example, a VHT AP can transmit frames from a secondary AC if such transmission does not make a TXOP longer when compared with frames from a primary AC. Consequently, an AP may have an on-going TXOP at a beginning of a wake period, a backoff counter of an AP's low priority AC may become zero before its low latency backoff counter, or a backoff counter of low priority traffic may have a smaller value than a backoff counter of low latency traffic.

To address such issues, a TXOP (e.g., a first TXOP) that overlaps with an rTWT SP may be ended or continued. In an embodiment, the TXOP is for low priority traffic and when the first TXOP is continued, low latency traffic is transmitted during a remaining duration of the TXOP. In one embodiment, when an AC becomes zero within the rTWT SP, the TXOP may be continued, such that low latency traffic is transmitted during a remaining duration of the TXOP. In such an embodiment, a Contention Window (CW) and a Quality of Service (QoS) Short Retry Counter (QSRC) of an AC are unchanged during the remaining duration of the TXOP. In another embodiment, when an AC becomes zero within the rTWT SP, the TXOP may be ended, such that low latency traffic is transmitted during a second TXOP. In such an embodiment, a CW and a QSRC of the AC are unchanged during the second TXOP.

Figure 4:
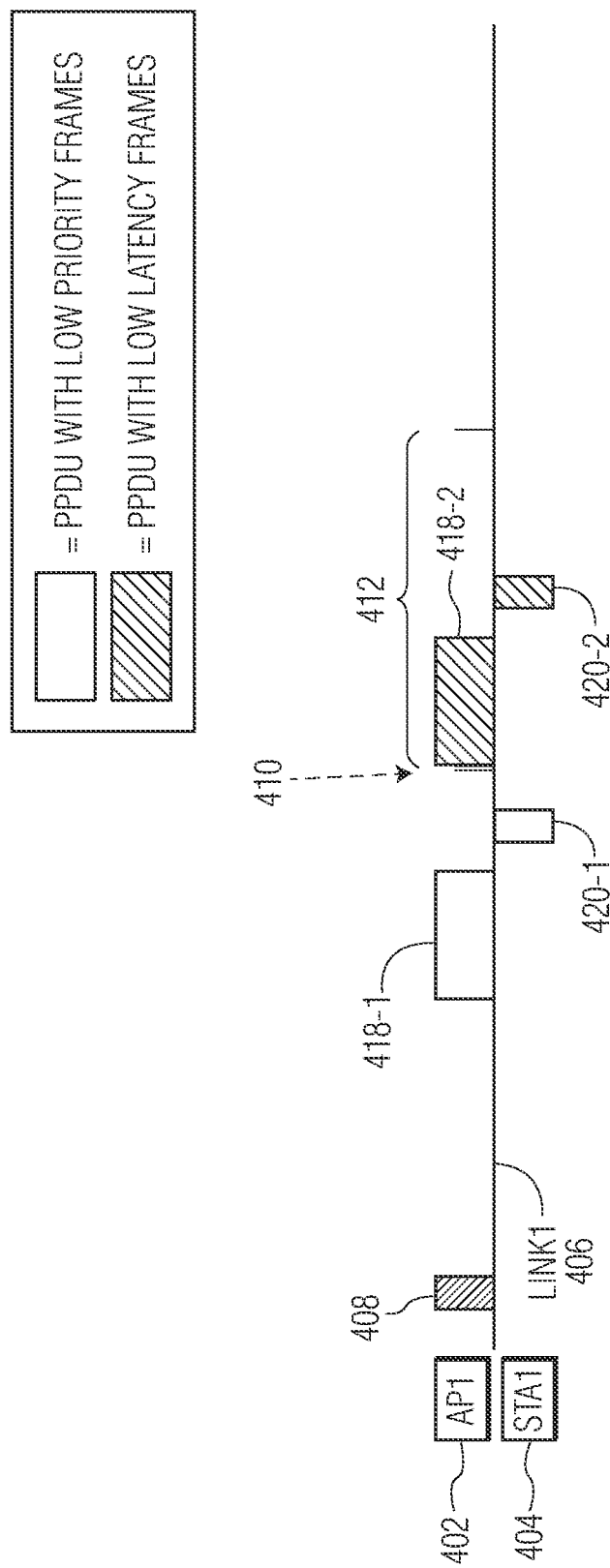
FIG. 4 illustrates another example of transmissions during an rTWT SP.

FIG. 4 illustrates another example of transmissions during an rTWT SP. In an embodiment, FIG. 4 includes the AP MLD (not shown) with AP1 402, the non-AP MLD (not shown) with STA1 404, and transmission of the beacon 408 that indicates the rTWT SP as previously described with reference to FIG. 3.

In contrast to FIG. 3, the transmissions are on one link, Link1 406, the rTWT SP starts at TWT Start Time (shown by dashed arrow 410) with one TWT Wake Duration 412, and multiple frames are transmitted. During a first TXOP (not shown) AP1 402 transmits a first PPDU 418-1 with low priority frames to STA1 404 and in response, STA1 404 transmits a first Block Acknowledgement (BA) frame 420-1 to AP1 402. Then, when the TWT Wake Duration 412 begins at the TWT Start Time (shown by dashed arrow 410), the first TXOP may be ended or continued. During the TWT Wake Duration 412, AP1 402 transmits a second PPDU 418-2 with low latency frames and in response, STA1 404 transmits a second BA frame 420-2 to AP1 402. The second PPDU 418-2 and the second BA frame 420-2 may be transmitted during the first TXOP or during a second TXOP (not shown).

If AP1 402 has an on-going TXOP (e.g., a first TXOP) for low priority traffic, AP1 may use a remaining duration of the TXOP for low latency traffic. To use the remaining duration of the TXOP, one restriction may be that a PPDU is transmitted after a TWT Start Time of the rTWT SP. As an example, the PPDU may need to carry low latency traffic or a trigger frame that solicits low latency frames from one or more STAs. Another restriction may be that to use the remaining time of the TXOP, the PPDU that carries low priority frames cannot end after the TWT Start Time of the rTWT SP. If AP1 402 has an on-going TXOP for low priority traffic, AP1 may need to stop the TXOP at a beginning of the rTWT SP so that low latency traffic can be serviced (e.g., exchanged) within a new TXOP (e.g., a second TXOP).

If an AP (e.g., AP1 402) has a backoff counter for low priority frames that becomes zero within a wake period (e.g., TWT Wake Duration 412) of the rTWT SP where low latency traffic needs to be serviced (e.g., exchanged), then the AP may need to use a TXOP (e.g., a first TXOP) for the low latency traffic. Otherwise, the AP may need to end (e.g., cancel) the TXOP, such that the CW and the QSRC of a related AC are not changed, e.g., during a second TXOP.

In one embodiment, when a remaining TXOP (e.g., first TXOP) or a whole TXOP (e.g., first TXOP) of low priority traffic is used for low latency traffic, the CW and QSRC setting during the remaining TXOP may be applied to an original low priority AC. In another embodiment, the CW and QSRC setting during the remaining TXOP may be applied to a low latency AC that is serviced. In some embodiments, when the remaining TXOP or the whole TXOP of low priority traffic is used for low latency traffic, the remaining TXOP is adjusted per a TXOP limit or a TWT SP duration (e.g., a TWT Wake Duration) of the serviced low latency traffic.

In some embodiments, at a beginning of an rTWT SP (e.g., a TWT Wake Duration), an AP may stop its backoff procedure that is not for low latency traffic. In one embodiment, if an AP wants to start a TXOP for low latency traffic within an rTWT SP, then the AP stops a backoff procedure of low priority ACs (i.e., the backoff counter that is not used for the low latency traffic). In such an embodiment, the backoff procedure may be stopped when backoff counters of the low latency traffic have a value that is more than the backoff counters that are not used for the low latency traffic. In another embodiment, if a backoff counter that is not used for the low latency traffic becomes zero and the backoff counters of the low latency traffic does not count down to zero within an rTWT SP, then an AP may not transmit frames from the AC of the backoff counter that is not used for the low latency traffic. In such an embodiment, the CW and QSRC of the low latency AC do not change.

In one embodiment, if a TXOP ending time is owned by an AP for low priority traffic (indicated by a Duration field of a frame transmitted by the AP) is after a start time of a TXOP, then the AP may need to stop its low latency PPDU transmission before the start time of an rTWT SP. In another embodiment, if an AP whose backoff counter of low priority traffic becomes zero before an rTWT SP cannot finish one frame exchange for low priority traffic, then the AP will not start a TXOP. In such an embodiment, the CW and QSRC of a related AC are unchanged.

For low latency service support, an AP may announce its rTWT agreements in a beacon, frame, PPDU, etc., an STA that supports rTWT may need to stop its TXOP at a beginning of an rTWT SP (e.g., TWT Wake Duration) announced by an associated AP (respecting of rTWT SPs of other APs not required), and/or low latency traffic may be transmitted first within an rTWT SP. Consequently, with Target Beacon Transmission Time (TBTT), the beacon is a frame that will be scheduled for transmission, and when the TBTT is within an rTWT SP, it is not clear which frame needs to be transmitted first. In addition, within a trigger enabled rTWT SP or a non-trigger enabled rTWT SP, a backoff counter of non-low latency traffic may become zero. As such, behavior under these conditions (e.g., behavior before and/or during an rTWT SP) may need to be defined.

In an embodiment, when a TBTT of an AP is within an rTWT SP, the AP schedules a beacon transmission regardless of whether low latency traffic has finished being transmitted. By scheduling the beacon transmission according to the TBTT, legacy STAs can successfully receive the beacon and avoid confusion. In another embodiment, when a Delivery TBTT (DTBTT) of an AP is within an rTWT SP, the AP schedules a Delivery Traffic Indication Map (DTIM) beacon regardless of whether the low latency traffic has finished being transmitted. In such an embodiment, group-addressed frames will be transmitted after low latency frames are transmitted.

Figure 5:
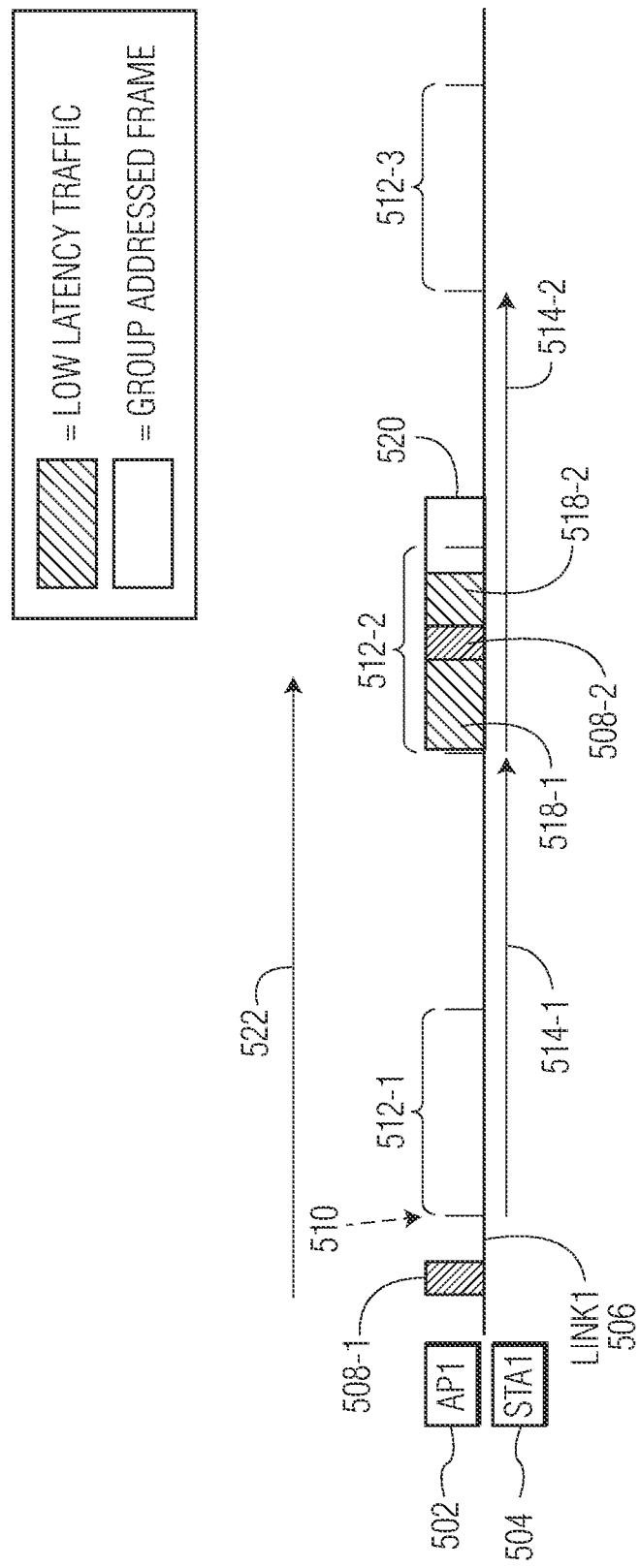
FIG. 5 illustrates another example of transmissions during an rTWT SP.

FIG. 5 illustrates another example of transmissions during an rTWT SP. In an embodiment, FIG. 5 includes the AP MLD (not shown) with AP1 502, the non-AP MLD (not shown) with STA1 504, Link1 506, and the rTWT SP that includes the TWT Start Time (shown by dashed arrow 510), the first TWT Wake Duration 512-1, the second TWT Wake Duration 512-2, the third TWT Wake Duration 512-3, the first TWT Wake Interval 514-1, the second TWT Wake Interval 514-2, as previously described with reference to FIG. 3.

In contrast to FIG. 3, AP1 502 transmits a first beacon 508-1 that indicates the rTWT SP and a TBTT 522 that indicates when a second beacon 508-2 will be transmitted by AP1. In addition, AP1 502 transmits low latency traffic via a first PPDU 518-1 at a beginning of the second TWT Wake Duration 512-2. AP1 502 stops transmitting the first PPDU 518-1 at an end of the TBTT 522, then transmits the second beacon 508-2. After transmitting the second beacon 508-2, AP1 502 resumes transmission of the low latency traffic via a second PPDU 518-2. Once AP1 502 has finished transmitting the low latency traffic, AP1 then transmits a group addressed frame 520 during the second TWT Wake Duration 512-2.

In some embodiments, when a TBTT of an AP is within an rTWT SP, the AP schedules a beacon transmission after low latency frames are transmitted. In another embodiment, when a DTBTT of an AP is within an rTWT SP, the AP schedules a beacon transmission after low latency frames are transmitted. In such an embodiment, group-addressed frames will be transmitted after low latency frames are transmitted.

Figure 6:
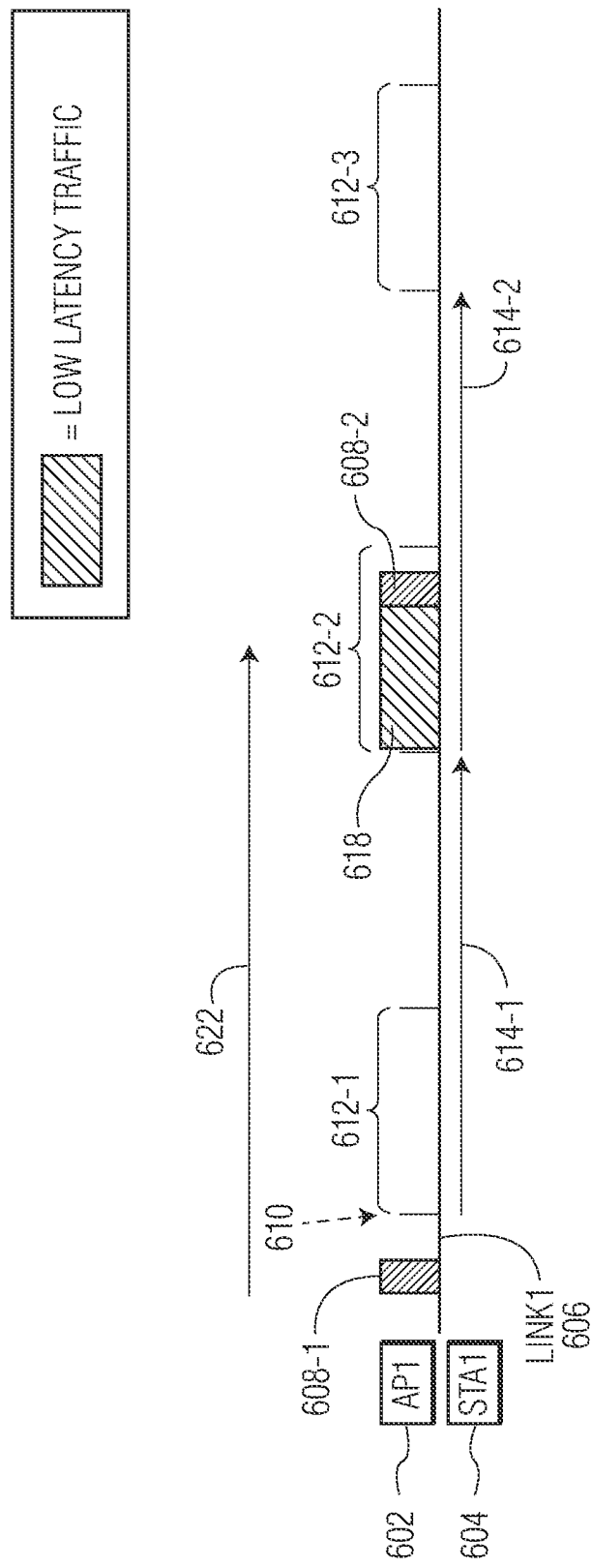
FIG. 6 illustrates another example of transmissions during an rTWT SP.

FIG. 6 illustrates another example of transmissions during an rTWT SP. In an embodiment, FIG. 6 includes the AP MLD (not shown) with AP1 602, the non-AP MLD (not shown) with STA1 604, Link1 606, the rTWT SP that includes the TWT Start Time (shown by dashed arrow 610), the first TWT Wake Duration 612-1, the second TWT Wake Duration 612-2, the third TWT Wake Duration 612-3, the first TWT Wake Interval 614-1, the second TWT Wake Interval 614-2, and transmission of the first beacon 608-1, the second beacon 608-2 after the TBTT 622, and the first PPDU 618 with low latency traffic as previously described with reference to FIG. 5.

In contrast to FIG. 5, AP1 602 transmits the second beacon 608-2 after the first PPDU 618 with the low latency traffic. In such an embodiment, although the TBTT 622 indicates a scheduled transmission of the second beacon 608-2, AP1 602 schedules to transmit the second beacon 608-2 after transmission of the low latency traffic is completed.

In some embodiments, a backoff counter of a TID may become zero within a trigger enabled rTWT SP or a non-trigger enabled rTWT SP (trigger/non-trigger enabled rTWT SP) before low latency traffic is transmitted. An STA's behavior within the trigger/non-trigger enabled rTWT SP with which the STA is a member may be in accordance with one or more of the embodiments described herein. In one embodiment, within an rTWT SP with which the STA is a member, if the STA's backoff counter of non-low latency traffic becomes zero and there are still frames of low latency traffic to transmit at the STA, then the STA does not transmit frames of non-low latency traffic. In another embodiment, within an rTWT SP with which the STA is a member, if there are still frames of low latency traffic to transmit at the STA, then the STA suspends a backoff procedure of non-low latency traffic. In such an embodiment, the STA resumes the suspended backoff procedure when the STA finishes transmitting the low latency traffic. In yet another embodiment, the STA selects one of the embodiments previously described.

An AP's behavior within a trigger/non-trigger enabled rTWT SP may be in accordance with one or more of the embodiments described herein.

In one embodiment, within an AP's rTWT SP, the AP uses a current CW to start another backoff procedure of non-low latency traffic instead of transmitting frames of non-low latency traffic. In such an embodiment, the AP uses the current CW to start another backoff procedure if the AP's backoff counter of non-low latency traffic becomes zero and there are still frames of low latency traffic to be transmitted by the AP, or the AP needs to trigger an uplink (UL) low latency traffic transmission.

In another embodiment, within an AP's rTWT SP, the AP suspends a backoff procedure of non-low latency traffic. In such an embodiment, the AP suspends the backoff procedure of the non-low latency traffic if the AP's backoff counter of non-low latency traffic becomes zero and there are still frames of low latency traffic to be transmitted by the AP, or the AP needs to trigger a UL Low latency traffic transmission.

In yet another embodiment, within an AP's rTWT SP, the AP transmits downlink (DL) low latency traffic or triggers a UL low latency traffic transmission. In such an embodiment, the AP transmits DL low latency traffic or triggers the UL low latency traffic transmission if the AP's backoff counter of non-low latency traffic becomes zero and there are still frames of low latency traffic to be transmitted by the AP, or the AP needs to trigger a UL Low latency traffic transmission. In yet another embodiment, the AP selects one of the embodiments previously described.

In some embodiments, an AP announces Enhanced Distributed Channel Access (EDCA) parameters for low latency traffic (rTWT TIDs of STAs that are members of an rTWT SP) and for non-low latency traffic (non-rTWT TIDs of STAs that are members of an rTWT SP and STAs that are not members of the rTWT SP). In such an embodiment, STAs that are rTWT SP members use the EDCA parameters for low latency traffic to perform backoff within the rTWT SP for low latency traffic transmissions. As an example, EDCA parameters for low latency traffic may be announced in a beacon or a TWT negotiation frame.

Figure 7:
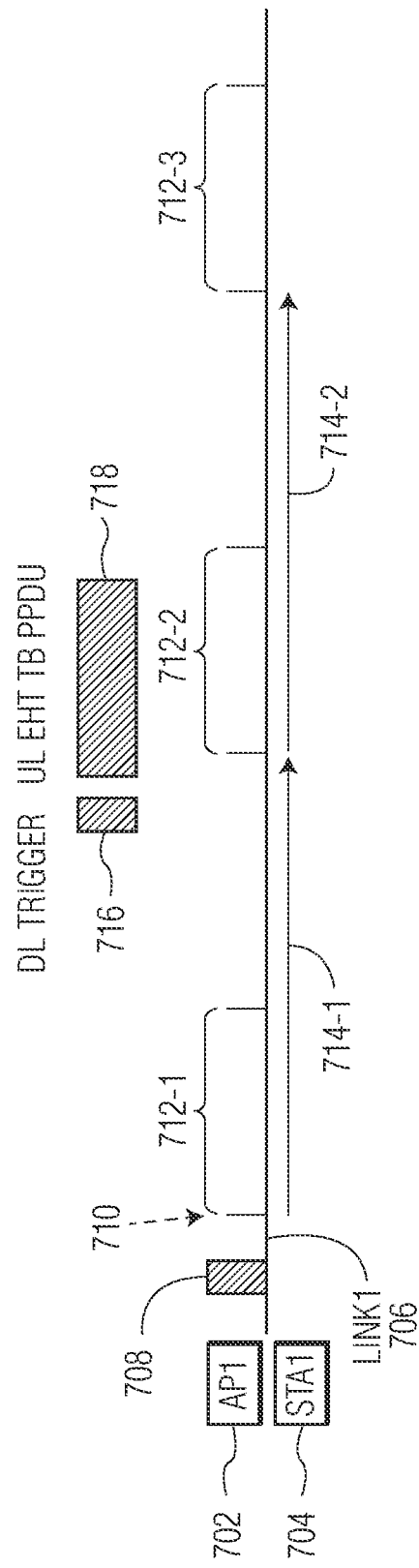
FIG. 7 illustrates another example of transmissions during an rTWT SP.

FIG. 7 illustrates another example of transmissions during an rTWT SP. In an embodiment, FIG. 7 includes the AP MLD (not shown) with AP1 702, the non-AP MLD (not shown) with STA1 704, Link1 706, and the rTWT SP that includes the TWT Start Time (shown by dashed arrow 710), the first TWT Wake Duration 712-1, the second TWT Wake Duration 712-2, the third TWT Wake Duration 712-3, the first TWT Wake Interval 714-1, and the second TWT Wake Interval 714-2 as previously described with reference to FIG. 5.

In contrast to FIG. 5, AP1 702 transmits a DL trigger frame 716 that solicits a UL EHT Trigger Based (TB) PPDU 718. In such an embodiment, the UL EHT TB PPDU 718 may be transmitted during the second TWT Wake Duration 712-2. Although not shown, in some embodiments, transmission of the DL trigger frame 716 and the UL EHT TB PPDU 718 may be disabled during the rTWT SP.

In some embodiments, an AP device (e.g., AP MLD) includes more than one AP (e.g., AP1 and AP2), where an STA associated with AP1 may interfere with rTWT SPs of other APs co-hosted with AP1, or other APs that are defined by a same Multiple BSS Identifier (BSSID) element as AP1. In some embodiments, an AP (e.g., AP1) may belong to a managed WLAN that includes more than one AP, where an STA associated with AP1 may interfere with rTWT SPs of other APs in the managed WLAN.

In an embodiment, for rTWT SPs under Multiple BSSID, an STA that supports rTWT may need to stop or end its TXOP at a beginning (e.g., TWT Start Time) of rTWT SPs announced by the STA's associated AP and other APs in a same group of APs defined by a Multiple BSSID as the associated AP. In another embodiment, for rTWT SPs under Multiple BSSID, an AP may need to stop its TXOP at a beginning of rTWT SPs announced by the AP and other APs that are in the same group of APs defined by the Multiple BSSID as the AP. Alternatively, instead of stopping or ending the TXOP at the beginning of its rTWT SP, the AP can use a remaining duration of the TXOP that is covered by the rTWT SP to transmit its low latency traffic frames, or schedule the STA to transmit their low latency traffic frames.

In some embodiments, (all) APs with non-transmitted BSSIDs have a same group of rTWT SPs as an AP of transmitted BSSID. In such an embodiment, an AP may announce the rTWT SPs used by other APs as fully occupied so that STAs associated with the AP will not try to join the rTWT SPs of the other APs.

In some embodiments, an AP (e.g., AP1) with transmitted BSSID and APs with non-transmitted BSSIDs announced by AP1 can have different rTWT SPs (e.g., rTWT SPs with different start times and different end times), such that each AP announces its own rTWT SP. In such an embodiment, an associated STA that supports the rTWT SP may determine the rTWT SPs of its associated AP and other APs defined by the same Multiple BSSID element as the STA's associated AP. In addition, the STA will stop its TXOP at the beginning of (all) the determined rTWT SPs.

In some embodiments, an AP (e.g., AP1) with transmitted BSSID broadcasts its rTWT SPs in TWT element(s) and rTWT SPs of non-transmitted BSSIDs in a new defined element or TWT element. As an example, the new defined element(s) are included in a Common Info field of a Multi-Link element, or in a beacon (without being carried in another element). In an embodiment, an associated STA that supports rTWT SPs determines rTWT SPs of its associated AP and other APs defined by a same Multiple BSSID element as the STA's associated AP. In such an embodiment, the STA will stop its TXOP at the beginning of (all) the determined rTWT SPs.

In an embodiment, for rTWT SPs under co-hosted APs, an STA that supports rTWT may need to stop or end its TXOP at a beginning (e.g., TWT Start Time) of rTWT SPs announced by the STA's associated AP and co-hosted APs. In another embodiment, for rTWT SPs under co-hosted APs, an AP may need to stop its TXOP at a beginning of rTWT SPs announced by the AP and co-hosted APs. Alternatively, instead of stopping or ending the TXOP at the beginning of its rTWT SP, the AP can use a remaining duration of the TXOP that is covered by the rTWT SP to transmit its low latency traffic frames, or schedule the STA to transmit their low latency traffic frames.

In one embodiment, an AP (e.g., AP1) belonging to a co-hosted AP group broadcasts its rTWT SPs in TWT element(s) and rTWT SPs of other APs in the co-hosted AP group in a new defined element. As an example, the new defined element may be a TWT element included in a Common Info field of a Multi-Link element, or a new defined element included in a beacon. An associated STA that supports rTWT can then determine the rTWT SPs of its associated AP and the other APs from the new defined element. As such, the STA will stop its TXOP at the beginning of the rTWT SPs determined from the new defined element.

In some embodiments, (all) APs belonging to a co-hosted AP group have a same group of rTWT SPs. In such an embodiment, an AP may announce the rTWT SPs used by other APs as fully occupied so that STAs associated with the AP will not try to join the rTWT SPs of the other APs.

In an embodiment, for rTWT SPs under managed WLAN, an STA that supports rTWT may need to stop or end its TXOP at a beginning (e.g., TWT Start Time) of rTWT SPs announced by the STA's associated AP and other APs in a same managed WLAN as the associated AP. In another embodiment, for rTWT SPs under managed WLAN, an AP may need to stop its TXOP at a beginning of rTWT SPs announced by the AP and other APs in a same managed WLAN as the AP. Alternatively, instead of stopping or ending the TXOP at the beginning of its rTWT SP, the AP can use a remaining duration of the TXOP that is covered by the rTWT SP to transmit its low latency traffic frames, or schedule the STA to transmit their low latency traffic frames.

In one embodiment, an AP (e.g., AP1) belonging to a managed WLAN broadcasts its rTWT SPs in TWT element(s) and rTWT SPs of other APs in the managed WLAN in a new defined element. As an example, the new defined element may be a TWT element included in a Common Info field of a Multi-Link element, or a new defined element included in a beacon. An associated STA that supports rTWT can then determine the rTWT SPs of its associated AP and the other APs in the managed WLAN from the new defined element. As such, the STA will stop its TXOP at the beginning of the rTWT SPs determined from the new defined element.

In some embodiments, an AP and its neighbor APs that belong to a same managed WLAN have a same group of rTWT SPs. In such an embodiment, an AP may announce the rTWT SPs used by other APs as fully occupied so that STAs associated with the AP will not try to join the rTWT SPs of the other APs.

An example of a TWT element is described in further detail with reference to FIG. 8.

Figure 8:
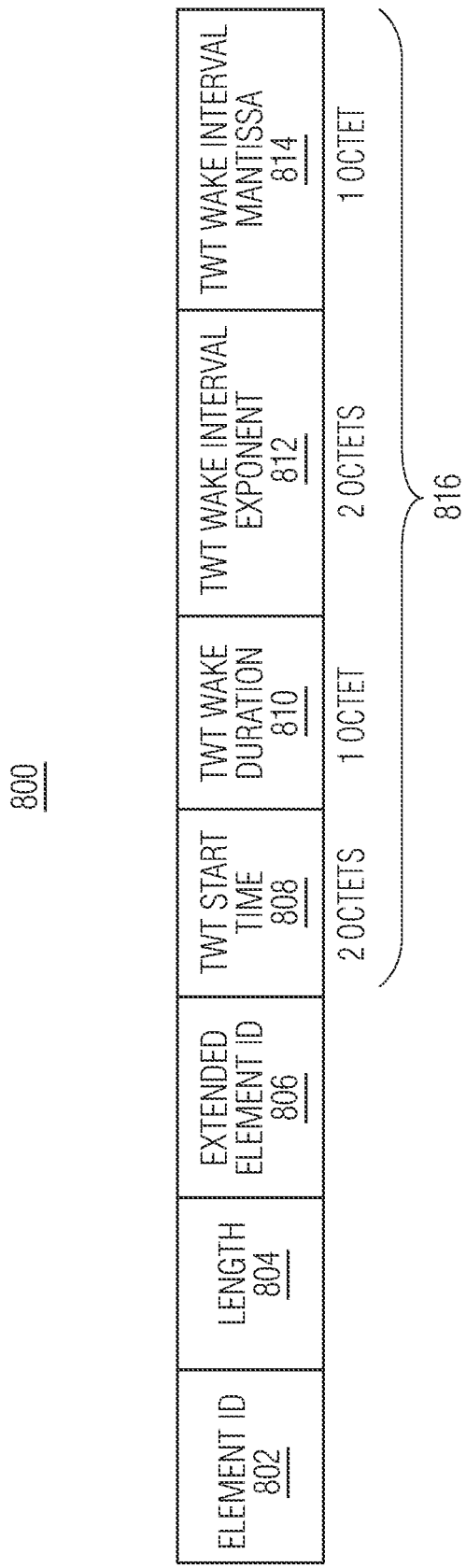
FIG. 8 depicts an example of a Target Wake Time (TWT) element.

FIG. 8 depicts an example of a TWT element 800. In some embodiments, the TWT element 800 is a new defined element that carries rTWT information of one or more other APs of an MLD (e.g., an AP MLD) associated with an AP that transmits the TWT element 800. For example, the TWT element 800 includes a TWT Start Time, a TWT Wake Duration, and a TWT Wake interval for each rTWT agreement of the one or more other APs.

In an embodiment, the TWT element 800 includes at least seven fields, implemented as an Element ID field 802, a Length field 804, an Extended Element ID field 806, a TWT Start Time field 808 that is two octets, a TWT Wake Duration field 810 that is one octet, a TWT Wake Interval Exponent field 812 that is two octets, and a TWT Wake Interval Mantissa field 814 that is one octet. In some embodiments, the TWT Start Time field 808, the TWT Wake Duration field 810, the TWT Wake Interval Exponent field 812, and the TWT Wake Interval Mantissa field 814 are included in a field set 816. The field set 816 may be repeated for each reported rTWT agreement of the one or more other APs.

Figure 9:
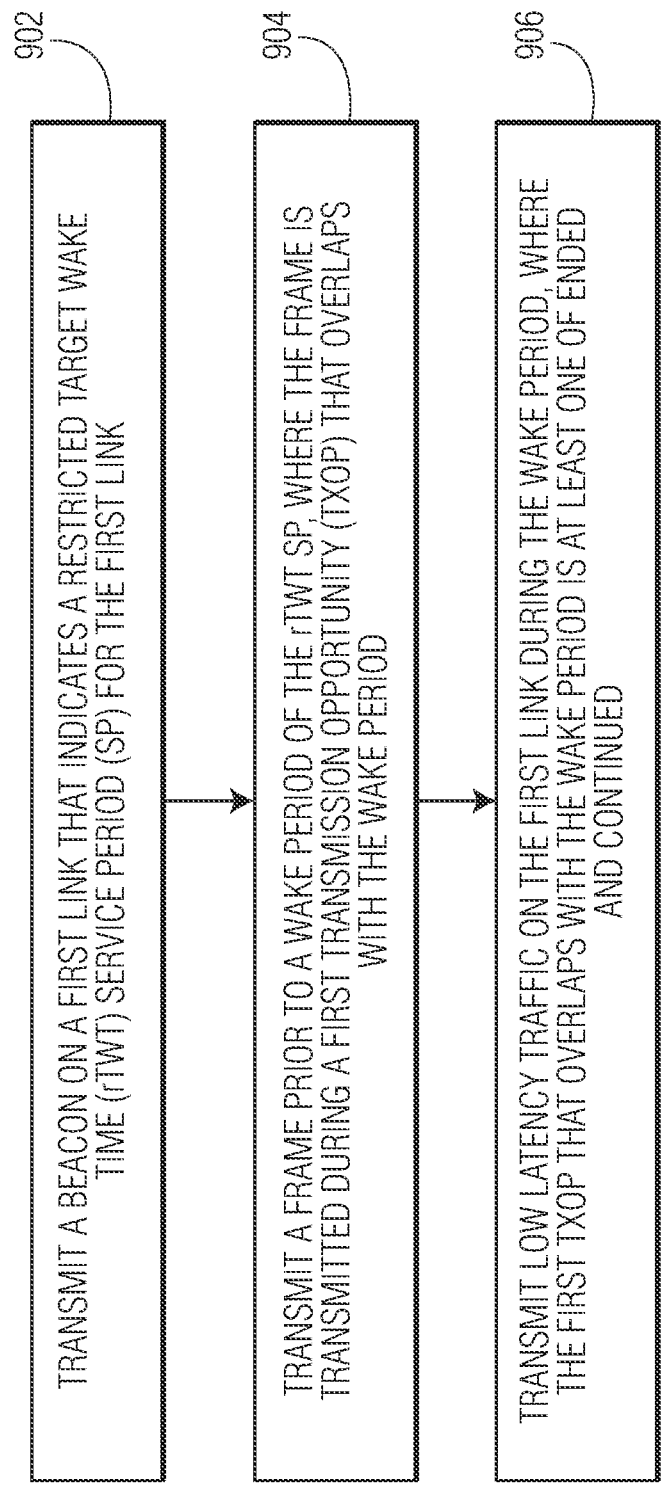
FIG. 9 illustrates a flow diagram of a technique for transmissions during an rTWT SP traffic in accordance with an embodiment of the invention.

FIG. 9 illustrates a flow diagram of a technique for transmissions during an rTWT SP in accordance with an embodiment of the invention. At block 902, a device transmits a beacon on a first link that indicates an rTWT SP for the first link. At block 904, the device transmits a frame prior to a wake period of the rTWT SP, where the frame is transmitted during a first TXOP that overlaps with the wake period. At block 906, the device transmits low latency traffic on the first link during the wake period, where the first TXOP that overlaps with the wake period is at least one of ended and continued.

In some embodiments, the technique for transmissions during an rTWT SP may be implemented by a device (e.g., an AP of an AP MLD). For example, a device may include a wireless network interface device implemented on one or more ICs, where the wireless network interface device is configured to transmit a beacon on a first link that indicates an rTWT SP for the first link, transmit a frame prior to a wake period of the rTWT SP, where the frame is transmitted during a first TXOP that overlaps with the wake period, and transmit low latency traffic on the first link during the wake period, where the first TXOP that overlaps with the wake period is at least one of ended and continued.

In some embodiments, the technique for transmissions during an rTWT SP may be implemented by a system. For example, a system includes a first wireless device, where the first wireless device includes a wireless network interface device implemented on one or more ICs, where the wireless network interface device is configured to transmit a beacon on a first link that indicates an rTWT SP for the first link, transmit a frame prior to a wake period of the rTWT SP, where the frame is transmitted during a first TXOP that overlaps with the wake period, and transmit low latency traffic on the first link during the wake period, where the first TXOP that overlaps with the wake period is at least one of ended and continued. In such an example, the system also includes a second wireless device, where the second wireless device includes another wireless network interface device implemented on one or more other ICs, where the other wireless network interface device is configured to receive the beacon, the frame, and the low latency traffic on the first link.

Figure 10:
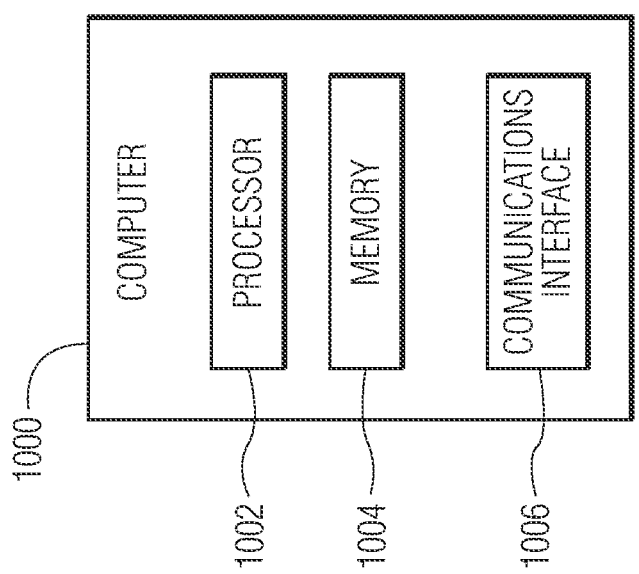
FIG. 10 depicts an example of a computer that can implement the technique for transmissions during an rTWT SP as described with reference to FIG. 9.

In an embodiment, the above-described functionality is performed at least in part by a computer or computers, which executes computer readable instructions. FIG. 10 depicts an example of a computer 1000 that can implement the technique for transmissions during an rTWT SP as described herein with reference to FIG. 9. As shown, the computer 1000 includes a processor 1002, a memory 1004, and a communications interface 1006. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 1000 may represent a wireless device (e.g., an AP, an AP MLD, a non-AP STA, or a non-AP STA MLD). In such an example, the wireless device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a wireless network interface device implemented on one or more integrated circuits (ICs), wherein the wireless network interface device is configured to:
transmit a beacon on a first link that indicates a restricted Target Wake Time (rTWT) Service Period (SP) for the first link;
transmit a frame prior to a wake period of the rTWT SP, wherein the frame is transmitted during a first Transmission Opportunity (TXOP) that overlaps with the wake period; and
transmit low latency traffic on the first link during the wake period, wherein the first TXOP that overlaps with the wake period is at least one of ended and continued.

2. The device of claim 1, wherein when the first TXOP is ended, the low latency traffic is transmitted during a second TXOP that starts at a beginning of the wake period.

3. The device of claim 1, wherein when the first TXOP is continued:
the frame is ended at a beginning of the wake period; and
the low latency traffic is transmitted during the first TXOP that continues through the beginning of the wake period.

4. The device of claim 1, wherein the first TXOP is ended by a non-access point (non-AP) station (STA) of a non-AP Multi-Link Device (MLD) associated with the device at a beginning of the wake period if at least one of:
the non-AP STA is a first non-AP STA associated with the device on the first link and is a member of the rTWT SP for the first link;
the non-AP STA is a second non-AP STA associated with the device on a second link and has an on-going TXOP on the second link, wherein the second non-AP STA is a TXOP holder; and
the non-AP MLD has Traffic Identifier (TID) to link mapping, wherein the low latency traffic is not mapped to the second link.

5. The device of claim 1, wherein a frame exchange on a second link is ended by an access point (AP) that is associated with a non-AP STA of a non-AP MLD at a beginning of the wake period if at least one of:
the non-AP STA is a first non-AP STA associated with the device on the first link and is a member of the rTWT SP for the first link;
the non-AP STA is a second non-AP STA associated with the device on the second link and has an on-going TXOP on the second link, wherein the second non-AP STA is a TXOP responder; and
the non-AP MLD has TID to link mapping, wherein the low latency traffic is not mapped to the second link.

6. The device of claim 1, wherein the first TXOP is continued by a non-AP STA of a non-AP MLD associated with the device at a beginning of the wake period if at least one of:
the non-AP STA is a first non-AP STA associated with the device on the first link and is a member of the rTWT SP for the first link;
the non-AP STA is a second non-AP STA associated with the device on a second link and has an on-going TXOP on the second link, wherein the second non-AP STA is a TXOP holder; and
the non-AP MLD has TID to link mapping, wherein the low latency traffic is mapped to the first link and the second link.

7. The device of claim 1, wherein a frame exchange on a second link is continued by an AP that is associated with a non-AP STA of a non-AP MLD at a beginning of the wake period if at least one of:
the non-AP STA is a first non-AP STA associated with the device on the first link and is a member of the rTWT SP for the first link;
the non-AP STA is a second non-AP STA associated with the device on the second link and has an on-going TXOP on the second link, wherein the second non-AP STA is a TXOP responder; and
the non-AP MLD has TID to link mapping, wherein the low latency traffic is mapped to the first link and the second link.

8. The device of claim 1, wherein:
the first TXOP is for low priority traffic; and
when the first TXOP is continued, the low latency traffic is transmitted during a remaining duration of the first TXOP.

9. The device of claim 1, wherein the first TXOP is at least one of ended and continued when a backoff counter for an Access Category (AC) becomes zero within the rTWT SP.

10. The device of claim 9, wherein when the first TXOP is continued, the low latency traffic is transmitted during a remaining duration of the first TXOP, where a Contention Window (CW) and a Quality of Service (QoS) Short Retry Counter (QSRC) of an AC are unchanged during the remaining duration of the first TXOP.

11. The device of claim 9, wherein when the first TXOP is ended, the low latency traffic is transmitted during a second TXOP, where a CW and a QSRC of the AC are unchanged.

12. The device of claim 1, wherein when a Target Beacon Transmission Time (TBTT) is within the rTWT SP, the device schedules another beacon transmission regardless of whether the low latency traffic has finished being transmitted.

13. The device of claim 1, wherein when a Delivery TBTT (DTBTT) is within the rTWT SP, the device schedules a Delivery Traffic Indication Map (DTIM) beacon regardless of whether the low latency traffic has finished being transmitted.

14. The device of claim 1, wherein the rTWT SP is at least one of a trigger enabled rTWT SP and a non-trigger enabled rTWT SP, and wherein a backoff counter of a TID becomes zero before the device transmits the low latency traffic.

15. The device of claim 14, wherein when the backoff counter of the TID becomes zero and an STA still has the low latency traffic to transmit, the STA uses a current CW to start another backoff procedure for non-low latency traffic.

16. The device of claim 14, wherein when the backoff counter of the TID becomes zero and an STA still has the low latency traffic to transmit, the STA suspends a backoff procedure for non-low latency traffic.

17. The device of claim 16, wherein the STA resumes the suspended backoff procedure when the STA finishes transmitting the low latency traffic.

18. The device of claim 1, wherein the beacon includes rTWT SP schedules of other APs that are at least one of:
in a same multiple Basic Service Set (BSS) Identifier (BSSID);
co-hosted APs; and
neighbor APs.

19. A system comprising:
a first wireless device, wherein the first wireless device includes a wireless network interface device implemented on one or more integrated circuits (ICs), wherein the wireless network interface device is configured to:
transmit a beacon on a first link that indicates a restricted Target Wake Time (rTWT) Service Period (SP) for the first link;
transmit a frame prior to a wake period of the rTWT SP, wherein the frame is transmitted during a first Transmission Opportunity (TXOP) that overlaps with the wake period;
transmit low latency traffic on the first link during the wake period, wherein the first TXOP that overlaps with the wake period is at least one of ended and continued; and
a second wireless device, wherein the second wireless device includes another wireless network interface device implemented on one or more other ICs, and wherein the other wireless network interface device is configured to receive the beacon, the frame, and the low latency traffic on the first link.

20. A method for transmissions during a restricted Target Wake Time (rTWT) Service Period (SP), the method comprising:
transmitting a beacon on a first link that indicates an rTWT SP for the first link;
transmitting a frame prior to a wake period of the rTWT SP, wherein the frame is transmitted during a first Transmission Opportunity (TXOP) that overlaps with the wake period; and
transmitting low latency traffic on the first link during the wake period, wherein the first TXOP that overlaps with the wake period is at least one of ended and continued.

* * * * *